United States Patent
Hamma et al.

[11] Patent Number: 5,251,074
[45] Date of Patent: Oct. 5, 1993

[54] METHOD AND APPARATUS FOR CONTROLLING A VIDEO SIGNAL PRINT SYSTEM

[75] Inventors: Kentaro Hamma, Katsuta; Yasunori Kobori, Yokohama; Hiroyuki Kimura, Kanagawa; Yoshinori Okada, Yokohama; Shoji Ohno, Katsuta; Osamu Numata, Katsuta; Kotaro Kawamura, Mito; Hideo Nishijima, Katsuta; Naohiro Ozawa, Yokohama, all of Japan

[73] Assignee: Hitachi, Ltd., Tokyo, Japan

[21] Appl. No.: 507,870

[22] Filed: Apr. 12, 1990

[30] Foreign Application Priority Data

Apr. 14, 1989 [JP] Japan .................... 1-092838
Jul. 28, 1989 [JP] Japan .................... 1-194072

[51] Int. Cl.⁵ .............................. H04N 5/782
[52] U.S. Cl. ..................... 360/10.1; 360/10.3; 360/14.1; 358/335
[58] Field of Search ............ 360/10.1, 10.3, 14.2, 360/14.3, 35.1, 13, 66, 10.2, 72.1–72.3; 358/335, 312, 302, 906, 311

[56] References Cited

U.S. PATENT DOCUMENTS

| | | | |
|---|---|---|---|
| 3,789,138 | 1/1974 | Terada | 360/10.3 |
| 4,290,081 | 9/1981 | Foerster | 360/10.3 |
| 4,393,416 | 7/1983 | Takeuchi et al. | 360/10.2 |
| 4,468,693 | 8/1984 | Fujita et al. | 360/14.3 |
| 4,703,366 | 10/1987 | Kohori et al. | 358/335 |
| 4,802,018 | 1/1989 | Tanikawa et al. | 358/335 |

FOREIGN PATENT DOCUMENTS 56-64884 6/1981 Japan .

OTHER PUBLICATIONS

Hanma et al., "A Color Video Printer With Sublimation Dye Transfer Method", IEEE vol. CE-31, No. 3, Aug. 1985, pp. 431-437.

Primary Examiner—W. R. Young
Attorney, Agent, or Firm—Antonelli, Terry, Stout & Kraus

[57] ABSTRACT

During the playback operation for freezing and storing a specific frame of a picture in a memory and thereafter printing the frame, the recording medium is turned reversely for a prescribed amount according to an instruction from a printer in response to the entry of the freeze command in order to accurately search the frame at the entry of the freeze, and thereafter the recording medium is played back in normal mode. The amounts of reverse turn and the successive forward turn in normal playback are counted and compared, and when the difference has become a prescribed value, a freeze signal is produced and the frame of the picture selected by the freeze command is stored in the memory and printed when required. This control method for use in a video print system is designed so that the recording medium is turned reversely for a prescribed amount according to an instruction from the printer and then stopped until the next command is entered.

28 Claims, 13 Drawing Sheets

METHOD AND APPARATUS FOR CONTROLLING A VIDEO SIGNAL PRINT SYSTEM

BACKGROUND OF THE INVENTION

This invention relates to a method and apparatus for controlling a video signal print system which stores in its memory the video signal of a desired frame of a picture played back on a video recording-playback apparatus.

Techniques pertinent to the present invention are described in the following publications.
1. JP-A-56-64884
2. U.S. Pat. No. 4,703,366

IEEE Transactions on Consumer Electronics, Vol. CE-31, No. 3, August 1985, pp. 431–437, "A COLOR VIDEO PRINTER WITH SUBLIMATION DYE TRANSFER METHOD", by Hanma et al.

The techniques described in the above publications do not consider such functions as the selection of a specific frame of a picture, e.g., a scene of swinging of a conventional golf club at the exact moment when its head hits a ball, and the accurate printing of the frame of the picture on a printer. Namely, the conventional techniques fail to extract a specific scene accurately and easily from a series of frames of a picture of active motion.

SUMMARY OF THE INVENTION

It is an object of this invention to provide a technique of selecting a specific frame of a picture accurately and easily from among a series of frames played back on a video recording-playback apparatus and introducing the frame to a printer.

Another object of this invention is to provide a system which marks, during the playback operation, a plurality of specific frames of a picture intended to be printed, and prints the marked frames in automatic or manual operation afterward.

In order to achieve the above objects, the system is designed to operate having a small amount of reverse tape feed and then enter the pause mode immediately after freezing (storing a specific frame in a memory) and/or issuing a print command. The amount of tape feed in both the forward and reverse directions is detected accurately so that the selected frame of the picture is introduced to the printer accurately.

The system is also designed to record a freeze mark on the source recording medium so that a plurality of frames are introduced sequentially to the printer automatically.

For the compatibility of the recording medium with other video recording-playback apparatuses, the system is designed to erase the freeze mark automatically on upon the completion of printing.

In addition, the system is designed to mute the audio output during the freeze marking operation and the frame printing operation.

The detection of the amount of tape feed according to this invention is implemented on the basis of the following five methods.

(1) Control signal scheme

Control signal pulses recorded on the control track of the tape are counted thereby to detect the amount of tape feed. The control signal is recorded in each frame of a picture, and this enables the frame-wise detection of a specified picture.

(2) FG scheme

FG (frequency generator) signals produced by a frequency generator in response to the movement of the tape are counted thereby to detect the amount of tape feed.

(3) Time code scheme

All frames of a picture are provided with a record of frame number or absolute address, and a specific frame is detected by detecting the corresponding frame number or absolute address.

(4) Combination of the control signal scheme and FG scheme

The control signal scheme and FG scheme are combined so that the amount of tape feed is detected on a dual-check basis, thereby preventing the erroneous counting of control signals due to noise or defects of the tape.

(5) Combination of the time code scheme and FG scheme

The time code scheme and the FG scheme are combined so that the amount of tape feed is detected on a dual-check basis, thereby preventing the erroneous detection of time codes due to noise or the like.

The video signal print system according to this invention is designed such that when the freeze key is pressed in the still playback mode, the tape is rewound for a prescribed amount and then the normal playback mode is restored, and thereafter the system enters the pause or stop mode. During this operation, the amount of tape feed in both the forward and reverse directions is counted accurately, and consequently the tape position for the frame of a picture selected in the still playback mode can be detected accurately in the normal playback mode. It then becomes possible to record a freeze mark at the detected position or to freeze and/or print the selected frame of a picture.

DESCRIPTION OF THE PREFERRED EMBODIMENTS

An embodiment of this invention will be described with reference to FIG. 1. The inventive control method and apparatus explained in the following is of the case of using a magnetic tape, although they are also applicable to a disk-shaped recording medium.

Figure 1:
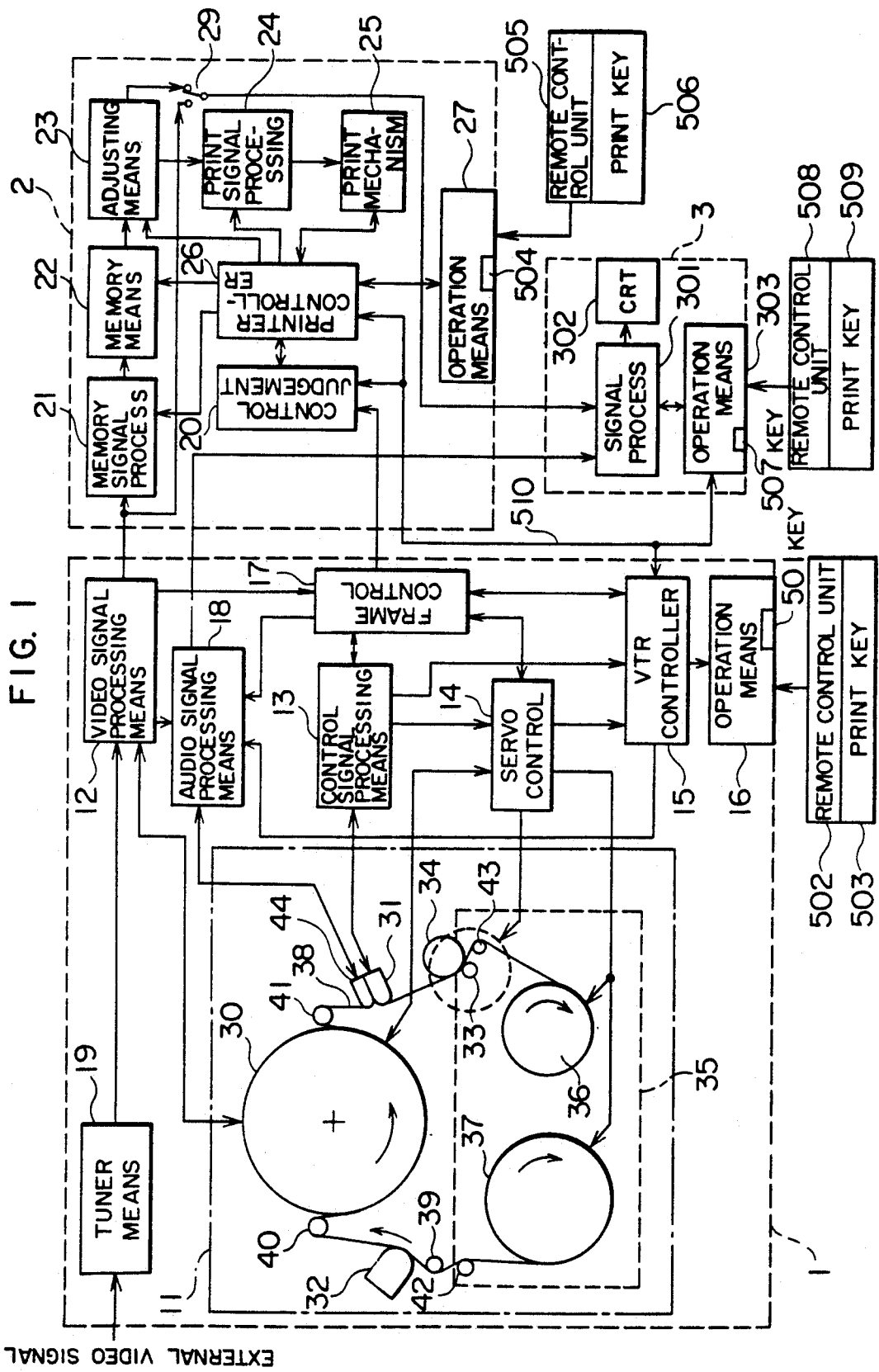
FIG. 1 is a block diagram showing an embodiment of this invention.

In FIG. 1, indicated by 1 is a magnetic recording-playback apparatus (which will be termed simply VTR hereinafter), and 2 is a video printer. The VTR 1 comprises a mechanism means 11, a video signal processing means 12, a control signal processing means 13, a servo control means 14, a VTR controller 15, an audio signal processing means 18, a tuner means 19, an operation means 16, and a frame control means 17. The tuner means 19 has a role of introducing an external video signal.

The mechanism means 11 comprises a rotary cylinder 30, with a pair of video heads being mounted thereon (not shown), a control head 31, an audio head 44, a full width erasing head 32, a capstan motor 33, a pinch roller 34, a tape cassette 35, a take up reel 36, a supply reel 37, a magnetic tape 38, a tension arm 39, and guide pins 40 to 43.

The video printer 2 comprises a control judgement means 20, a memory signal processing means 21, a memory means 22, an adjusting means 23, a print signal processing means 24, a printer mechanism means 25, a printer controller 26, and an operation means 27.

Indicated by 3 is a monitor unit, which comprises a signal processor 301, a CRT 302, and an operation means 303. The operation means 303 is connected to the VTR controller 15, the control judgement means 20, and the printer controller 26 through bus lines 510.

The operation means 16, 27 and 303 are provided with freeze and/or print command keys 501, 504 and 507, respectively, and are connected with respective remote controllers 502, 505 and 508, which are also provided with freeze and/or print command keys 503, 506 and 509, respectively.

For freezing and printing a desired frame of a picture, there are four operational modes as follows.

(A) Direct mode 1

A desired frame of a picture is selected in the normal playback mode of the VTR, and then freezed and/or printed. The tape is rewound slightly following the freeze command, and the VTR enters the pause mode. The freeze mark is not used in this mode.

(B) Direct mode 2

A desired frame of a picture is selected in the slow or still playback mode of the VTR and, after being rewound, the tape is played back in the normal mode, and the frame is freezed and printed. The freeze mark is not used in this mode.

(C) Frame mark mode

A desired frame of a picture is selected in the slow or single-frame playback mode, while implementing the playback confirmation concurrently, and a freeze mark is recorded in the selected frame. After several frames have been marked in this manner, all marked frames are freezed and/or printed automatically (or in manual operation). This mode is particularly useful for selecting a scene of active movement.

(D) Area mark mode

An area mark (freeze mark) indicative of the presence of a desired frame of a picture is recorded in the vicinity of that frame, while implementing the playback confirmation throughout the tape, and thereafter desired areas are searched in the fast (search) playback mode (forward and reverse) and all frames with the area marks are printed. Among the desired areas, a preferable frame of picture is selected based on the freeze mark mode of item (C), and it is freezed and/or printed. This mode is useful to freeze and/or print a specific frame of slow movement.

Figure 2:
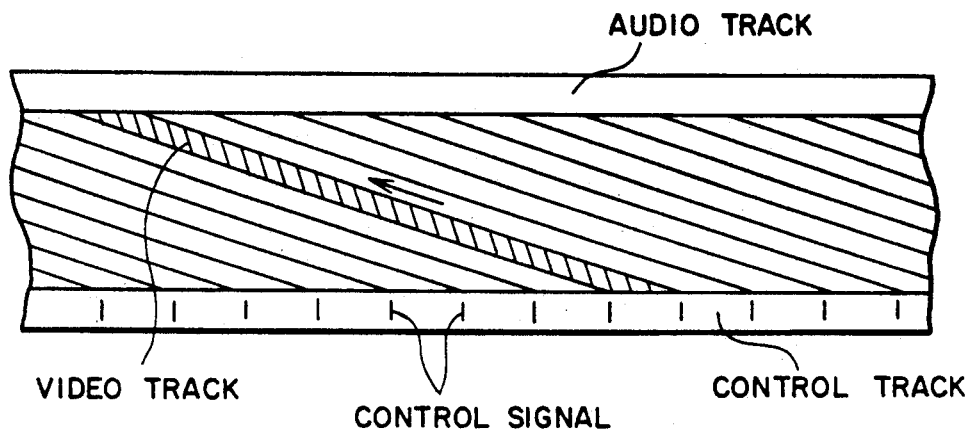
FIG. 2 is a diagram showing the layout of tracks on a tape.

FIG. 2 shows the layout of tracks on the magnetic tape 38. This is an example of the VHS system. A hatched area is one of video tracks, with the tracing direction being indicated by the arrow. Normally, the control signal and audio signal are recorded on the control track and audio track concurrently to the recording of the video signal.

The operation of the direct mode 1 of item (A) will be explained using FIG. 1. Initially, the VTR 1 is in the normal playback mode, and the magnetic tape 38 is being fed at the prescribed speed from the supply reel 37 to the take up reel 36 in the direction indicated by the arrow in FIG. 1. The signal picked up from the magnetic tape 38 by a video head pair (not shown) on the rotary cylinder 30 is subject to such processings as amplification and demodulation by the video signal processing means 12. This allows the video signal (including a luminance signal and a chroma signal or color difference signal) is reproduced, and then delivered to the printer 2.

In obtaining the reproduced video signal, the control signal picked u by the control head 31 is amplified and shaped by the control signal processing means 13. The control signal is then supplied to the servo control means 14, which implements the drive control for the capstan motor 33 so that the magnetic tape 38 advances with a prescribed. This control signal is detected when the video head has come to the read start position of the video track.

The video signal introduced to the printer 2 is separated into the luminance signal and the color difference signal or R (red), G (green) and B (blue) signals by the memory signal processing means 21, and these signals are delivered to the memory means 22. In response to the freeze command from the controller 15 of the VTR 1 or the printer operation means 27, the printer controller 26 issues a freeze command to the memory means 22 so that the supplied video signal is stored in it instantaneously. The memory means 22 turns to the read mode immediately after it has stored the video signal, and the readout frame of the picture is displayed on the monitor unit 3 by way of the adjusting means 23.

In response to a print command from the operation means 16 or 27, the readout frame is introduced to the print signal processing means 24. The data is then reformatted for printing and printed on the print mechanism means 25 such as a video printer.

Figure 3:
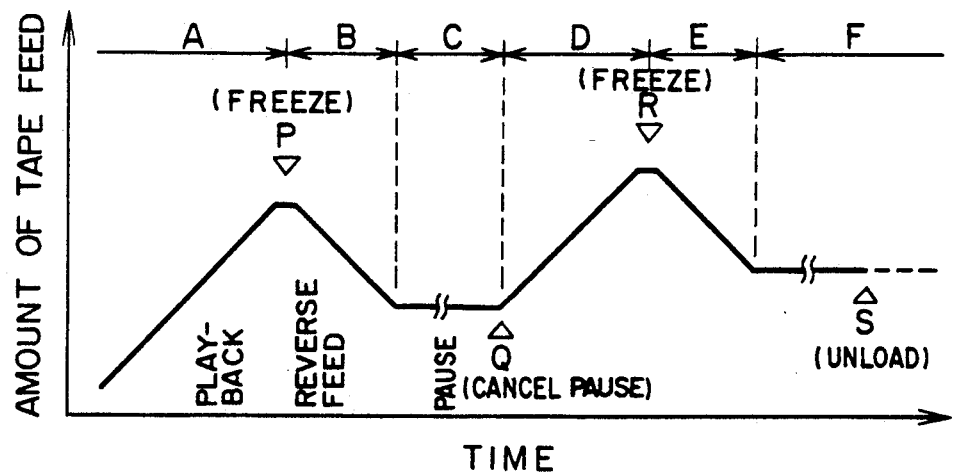
FIG. 3 is a diagram showing the tape feed operation according to an embodiment of this invention.

The following describes the operation of the VTR 1 immediately after the printer 2 has recorded the input frame in the memory means 22, with reference to the tape feed operation diagram of FIG. 3. In FIG. 3, the amount of forward tape feed is plotted on the vertical axis against time on the horizontal axis.

During the operation in normal playback mode (period A), a freeze command is issued at time point P and a frame of a picture is introduced to the memory means 22. Immediately after that, a freeze end signal from the printer controller 26 is sent to the VTR controller 15 of the VTR 1. In response to this signal, the VTR controller 15 issues a stop-and-reverse command to the servo control means 14 so that the tape is rewound by a few frames (period B), and thereafter the VTR 1 enters the pause mode (still playback mode) (period C). The pause mode is cancelled by the timer function in the VTR controller 15 or in response to the print command signal from the printer controller 26. The tape 38 is scanned continuously at its same position during the pause mode, and in order to protect the tape from wearing, it may be taken (unloaded) off the rotary cylinder 30.

It occurs frequently that a stored frame of a picture (will be termed freezed frame) is not the intended one and freezing of another frame is desired at the front or back of it. In this case, the playback command is entered on the operation means 16 of the VTR 1, for example, thereby to cancel the pause mode (point Q). The pause mode may be cancelled by entering the freeze command or the pause cancellation command on the operation means 16 or 17. Consequently, the VTR 1 displays the previous frame again, allowing the user to have another entry of the freeze command at the intended scene (point R). During the period including point S, the tape 38 is unloaded due to the issuance of the print command or the like.

The operation of the direct mode 2 of item (B) will be explained on the tape feed operation diagram of FIG. 4. First, the VTR 1 operating in the playback mode (period A) is brought to the slow or single-frame feed mode (period B), and a frame of a picture which is intended to print is selected. In this case, the desired frame is selected using the slow or single-frame feed function because of significant variations of reproduced pictures in every frame. Freezing a frame of a picture directly in the still mode is not recommended because of its deteriorated picture quality. Accordingly, the freeze command is entered (at P1 in FIG. 4) during the still playback of the intended frame (period C). Consequently, the VTR 1 operates to rewind the tape slightly while counting (up-counting) the amount of reverse feed NB (period D). Subsequently, the VTR resumes the normal playback operation (period E), while up-counting the amount of tape feed separately, until the count value approaches NB. At the arrival of the count value at a prescribed value NP near the value NB (NP<NB) (at P2 in FIG. 4), the VTR 1 issues a freeze command to the printer 2 while retaining the normal playback operation so that the selected frame of the picture is stored in the memory means 22 in the printer 2. The condition of NP<NB is to issue the freeze command in advance of the intended frame by a few frames in order to offset the time lag of the freeze operation of the printer. When the printer 2 has stored the frame, it issues a stop command to the VTR 1. Alternatively, the printer issues a stop command following a slight reverse tape feed so that the VTR is ready to proceed to the subsequent operation. After that, the printer starts printing automatically or by the manual operation.

In case the same counter is used to count the amount of tape feed, an initial value No is preset to the counter before the tape is rewound. Subsequently, the tape is rewound while the counter up-counts, and then the tape is fed in the normal playback mode while the counter down-counts, and the freeze command is issued when the count value has reached Np near the value No (Np>No). For manual printing, the freezed frame is confirmed and adjusted for the picture quality, and then the print command is entered to print the frame.

There are two printing modes for printer 2. One is the auto printing mode and the other is the manual printing mode. In the auto printing mode, the printing is started at the same time as the image freezing operation. The VTR 1 is returned to the normal playback mode at the end of the printing.

In the manual printing mode, the printing is started by an inputted print command after the freezed image is checked and the image quality is adjusted.

The following describes an embodiment of this invention for detecting the amount of tape feed when the selected frame of a picture is freezed in the single-frame feed mode or still mode.

Figure 5:
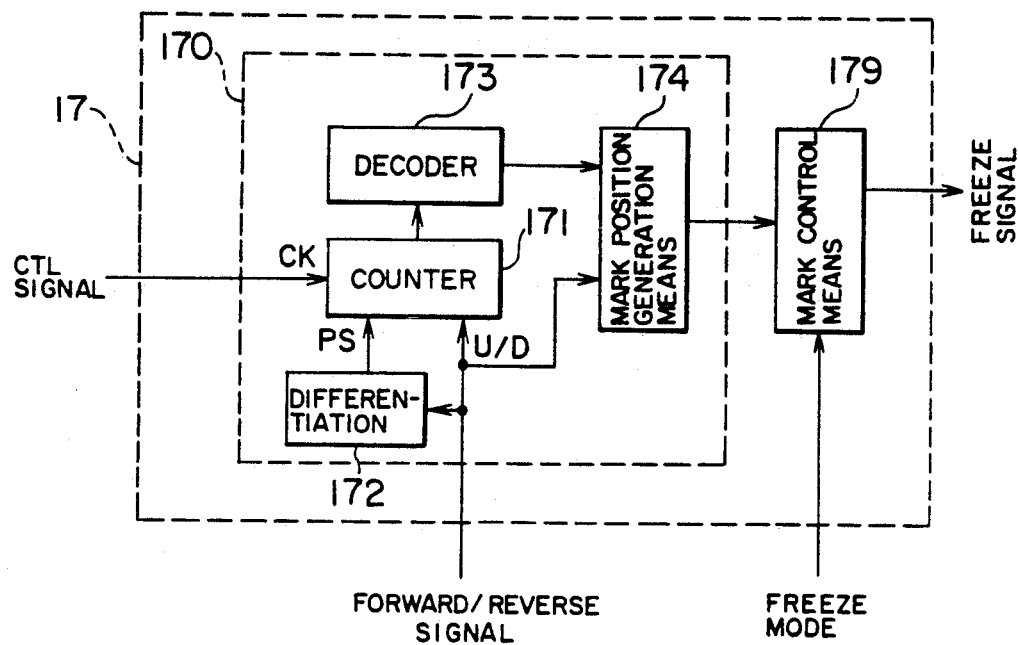
FIG. 5 is a block diagram showing the arrangement for detecting the amount of tape feed according to an embodiment of this invention.

FIG. 5 shows an embodiment of this invention based on the control signal scheme of item (1). Shown in FIG. 5 is an embodiment of the frame control means 17 shown in FIG. 1. The frame control means 17 comprises a tape feed value detection mean 170 and a mark control means 179. The tape feed value detection means 170 comprises a counter 171, a differentiation circuit 172, a decoder 173, and a mark position generation means 174.

Figure 6:
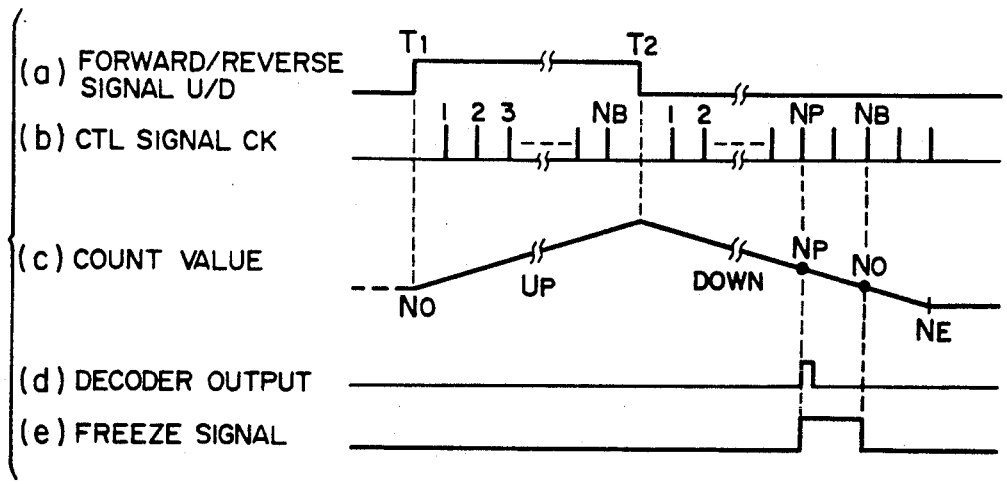
FIG. 6 is a diagram used to explain the operation of the arrangement shown in FIG. 5.

Next, the operation of the above arrangement will be explained in connection with FIG. 4 and FIG. 6. In FIG. 4, on selecting a frame with the intention to freeze, the freeze command (or print command) is entered at P1 on the operation means 16 or 27. In response to this command, the VTR controller 15 activates the capstan motor 33 reversely only for a period of a few frames (period D), and thereafter feeds the tape forwardly in the normal playback mode (period E). In FIG. 6, the forward/reverse signal for the capstan motor 33 is supplied to the counter 171, differentiation circuit 17 and mark position generation means 174. The signal applied to the up/down (U/D) terminal of the counter 171 determines the polarity of counting. Namely, at the time when the capstan motor 33 starts reversing, the forward/reverse signal goes high ($T_1$ in FIG. 6) to switch the counter 171 to its up-count mode. The positive transition of the forward/reverse signal is detected by the differentiation circuit 172, and it provides a preset (PS) pulse to the counter 171. Then, the counter 171 is set to the initial value (No), and subsequently it counts the control signal (will be termed CTL signal) which is received during the reversing period ((b) and (c) in FIG. 6). Subsequently, at the time when the capstan motor 33 makes a transition to the forward rotation, the forward/reverse signal goes low ($T_2$ in FIG. 6), and the counter 171 down-counts the CTL signal.

When the count value has reached the predetermined value Np (Np>No), it is detected by the decoder 173, which then sends a pulse shown by (d) in FIG. 6 to the succeeding mark position generation means 174. The mark position generation means 174 responds to this pulse to generate a mark position signal shown by (e) in FIG. 6. The further succeeding mark control means 179 receives the freeze mode signals (including a freeze operation command entered to the VTR controller 15 and a record/playback command) from the VTR controller 15, and produces a freeze signal. In response to the freeze signal, the control judgement means 20 (FIG. 1) lets the memory means 22 store the intended frame of the picture via the printer controller 2.

Figure 7:
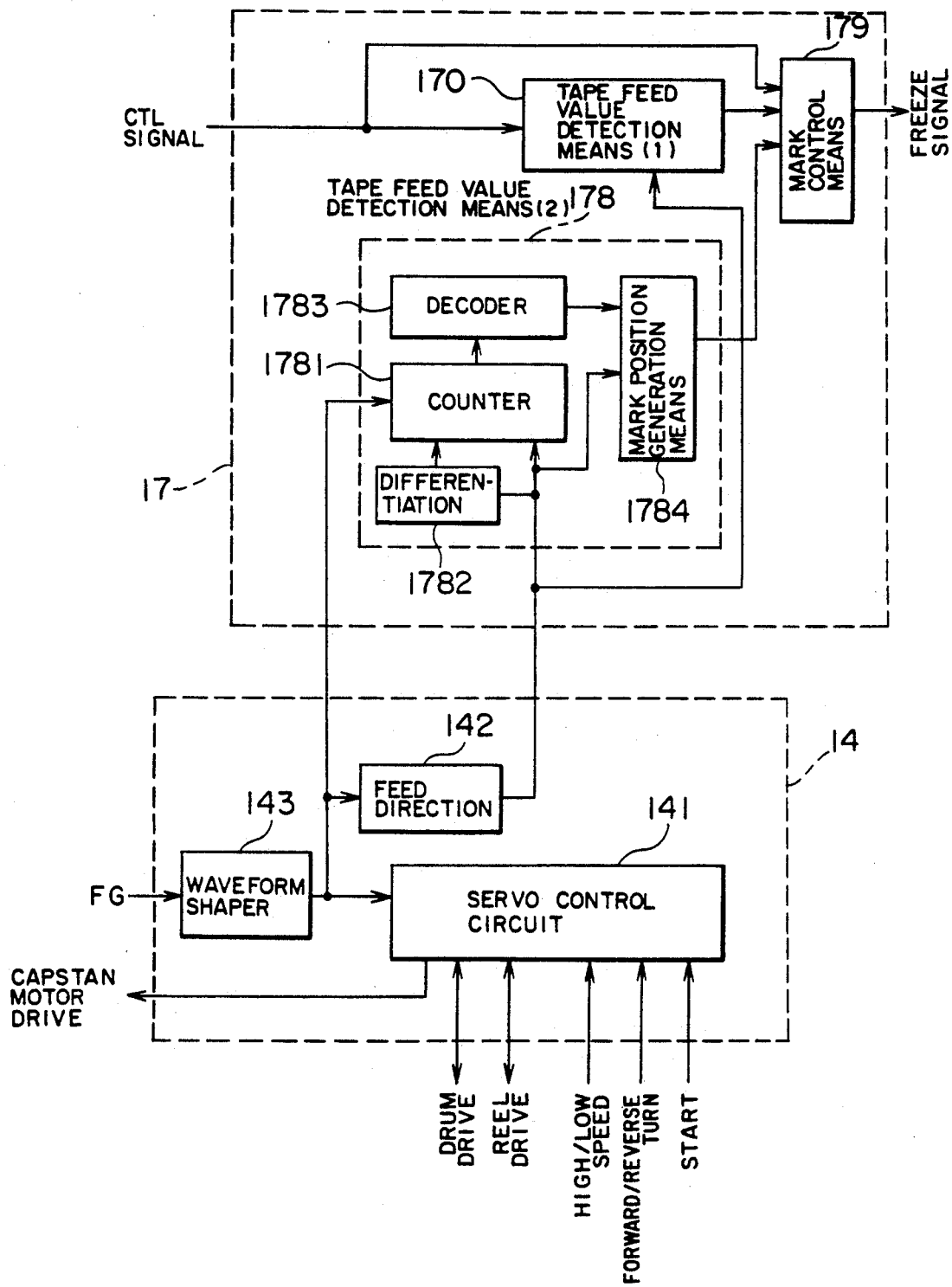
FIG. 7 is a block diagram showing the arrangement for detecting the amount of tape feed according to another embodiment of this invention.

FIG. 7 shows an embodiment of the above-mentioned method of item (4) for detecting the amount of tape feed. Shown in the figure is an embodiment of the servo control means 14 and frame control means 17 in FIG. 1. In FIG. 7, functional components identical to the components of FIG. 1 and FIG. 5 are referred to by the same numbers. In FIG. 7, the servo control means 14 comprises a servo control circuit 141, a rotational direction detection means 142 and a waveform shaping circuit 143. The frame control means 17 comprises a tape feed value detection means (1) 170, a mark control means 179 and a tape feed value detection means (23) 178. The tape feed value detection means (2) 178 comprises a counter 1781, a differentiation circuit 1782, a decoder 1783, and a mark position generation means 1784. Although the circuit arrangement is shown to comprehend the control signal scheme of FIG. 5, it is of course possible to use the section of the tape feed value detection means (2) 178 alone for counting the FG pulse.

The operation of the circuit will be explained based on an example of FIG. 4. First, the servo control circuit 141 implements the drive control for the capstan motor 33 in accordance with the start/stop signal, forward-/reverse signal, and high/low speed command signal from the VTR controller 15. A feedback signal FG produced in proportion to the amount of tape feed by a frequency generation means or the like is responsive to the rotation of the capstan motor 33 and is supplied to the waveform shaping means 143. The FG signal is shaped into a rectangular wave signal by the waveform shaping means 143, and then delivered to the servo control circuit 141 and the rotational direction detection means 142. The servo control circuit 141 comprises a speed control means or phase control means used in the usual VTRs. The rotational direction detection means 142 is a forward/reverse rotation ,detection means based on the two-phase FG signal used in the usual VTRs. It is designed to provide a low-level output when the capstan motor 33 rotates the magnetic tape in the forward direction, and provide a high-level output when the motor rotates the tape in the reverse direction, for example. During the period D in FIG. 4, the forward/ reverse detected signal has a high level. The FG signal and forward/reverse signal are delivered to the frame control means 17.

Figure 8:
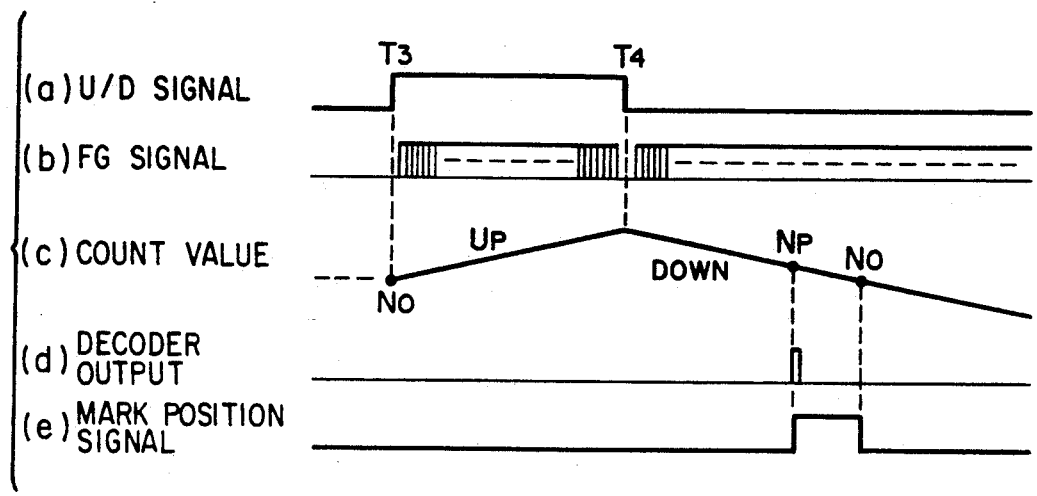
FIG. 8 is a diagram used to explain the operation of the arrangement shown in FIG. 7.

Next, the operation of the tape feed value detection means (2) 178 will be explained in connection with the timing chart of FIG. 8. At time P1 in FIG. 4, when the capstan motor 33 starts rotating reversely, the output of the rotational direction detection means 142 goes high (T3 in FIG. 8). The rising edge of the forward/reverse detected signal is detected (by differentiation) by the differentiation circuit 1782, which then presets the counter 1781 to No=0 for example ((C) in FIG. 8). At the same time, the counter 1781 has up-count mode and it counts up as the capstan motor rotates reversely. After the tape has been fed reversely for the amount of a few frames, the servo control means 14 rotates the capstan motor 33 forwardly in response to the forward-/reverse command from the VTR controller 15, and the VTR enters the normal playback mode (period E in FIG. 4). At the same time, the forward/reverse detected signal goes low (T4 in FIG. 8), causing the counter to have down-count mode, and it counts down the contents in response to the FG input. After the tape has been fed forwardly by a amount virtually equal to the proceeding reverse feed, the count value of the counter 1781 approaches the preset value (No=0). The count value is monitored constantly by the decoder 1783, and when it has reached a predetermined value NP (NP>No), the decoder 1783 provides a detection pulse shown by (d) in FIG. 8 to the succeeding mark position generation means 1784. Consequently, the mark position generation means 1784 produces a mark position signal shown by (e) in FIG. 8. The mark position signal has a phase such that it rises when the counter 1781 in down mode has a count value of NP and it falls at a count value of No, for example. Namely, it is intended to let the mark control means 179 have a preparatory operation when the tape feed value is NP in approaching No, so that it indicates the frame position to be freezed at the falling edge of the mark position signal.

The FG signal (having frequencies from several hundred Hertz to several killo-Hertz) is very useful for the detection of the tape feed value, but it is not related directly to the phase of the control (CTL) signal and reproduced video frame (30 Hz or 25 Hz). Therefore, it is useful merely for the detection of the approximate position of a frame to be freezed, and it is used preferably in combination with the CTL signal or the vertical sync signal in the reproduced video signal.

The tape feed value detection means (1) 170 is arranged as shown in FIG. 5 as an embodiment. The CTL signal is also supplied to the mark control means. Upon receiving the command of the freeze mode from the VTR controller 15, the tape feed value detection means 170 produces a freeze signal in synchronism with the CTL signal which is generated during the period of the mark position signal (shown by (e) in FIG. 8). The mark control means 179 has a function of selecting the use of either the tape feed value detection means 170 or 178 depending on the remaining circuit arrangement. In case the CTL signal is not used at all, it is possible to produce the freeze signal merely from the mark position signal, and this is an embodiment of the method of the tape feed value detection method based on the FG scheme of item (2).

Next, the above-mentioned time code scheme of item (3) will be described. The time code recording scheme uses the control track and the blanking period of the video signal, and the address is recorded and reproduced in all or part of the frames.

Figure 9:
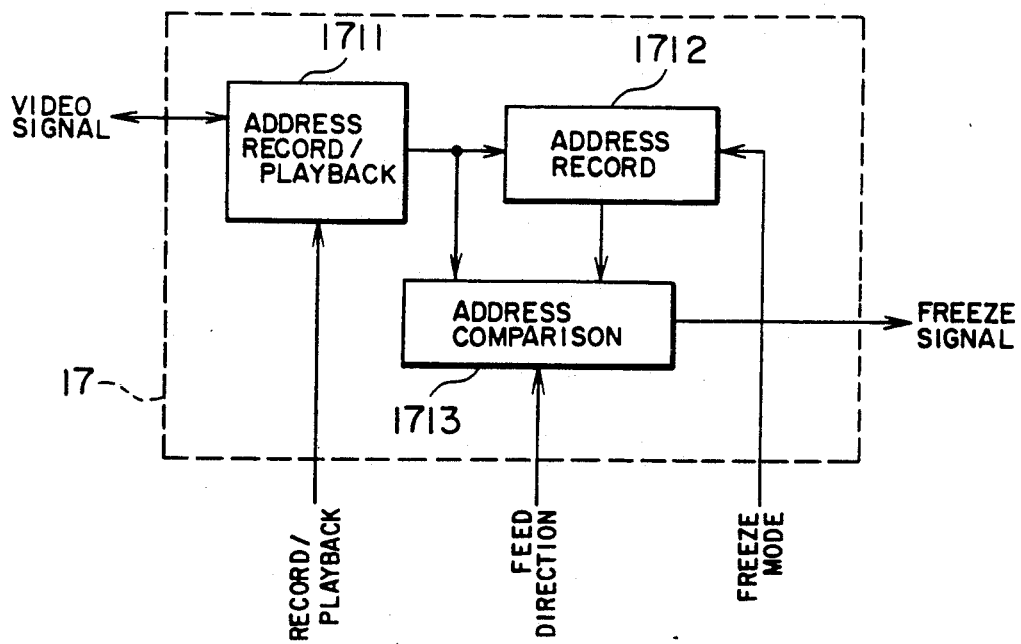
FIG. 9 is a block diagram showing the arrangement for detecting the amount of tape feed according to still another embodiment of this invention.

FIG. 9 shows an embodiment of this scheme. In FIG. 9, the frame control means 17 comprises an address recording/reproduction means 1711, an address memory means 1712, and an address comparison means 1713, and these means operate in accordance with the control signals from the VTR controller 15.

Next, the operation will be explained. The reproduced video signal or reproduced control signal is entered to the address recording/reproduction means 1711. This means always detects the address during the playback of the tape, and delivers the detected address to the succeeding address memory means 1712 and address comparison means 1713. Upon selecting a frame of the picture to be freezed through the single-frame feed or the like, the freeze command is entered on the operation means 16 or 27. Consequently, the freeze mode signal is sent from the VTR controller 15, and the address of the selected frame is stored in the address memory means 1712. Subsequently, after the tape has been rewound slightly by the VTR controller 15, the VTR enters the normal playback mode. Addresses reproduced on the tape are compared with the stored address in the address memory means 1712, and at the front of the selected frame, the address comparison means 1713 produces a freeze signal. The address memory means 1712 is capable of storing a plurality of addresses, and therefore the operation may be such that addresses of the frames to be freezed (or printed) among all the frames are stored and thereafter they are freezed (or printed) sequentially.

The accomplishment of the tape feed value detection means (1) 170 in FIG. 7 by the embodiment of FIG. 9 results in an embodiment of the tape feed value detection method of item (5) based on both the time code scheme and the FG scheme. In this case, the CTL signal in FIG. 7 is the video signal, and the mark position signal produced by counting the FG pulse is used in precedence for the position detection. Namely, the freeze signal is produced in synchronism with the video signal during the active period of the mark position signal (shown by (e) in FIG. 8).

Next, the operational method of the frame mark mode of item (C) will be explained. This mode is mainly intended to freeze and/or print a specific frame among frames of a picture of active movement. The operation will be explained using the flowchart of FIG. 10 and the tape feed operation diagram of FIG. 4. First, during the playback operation of the VTR 1 (period A), a frame of the picture which is intended to print is selected in the slow or single-frame feed mode (period B). Generally, a section of active movement is played back in slow mode. Because of the significant differences in the picture among reproduced frames, a frame of the picture which is intended to print is selected using the slow or single-frame feed function. It is generally difficult to write-in the freeze mark signal directly on the control track during the operation in still mode in which the record medium. Therefore, in the state of still playback for the intended frame (period C), the freeze mark write command or freeze command is entered. The freeze command merely stores a frame in the memory without a freeze mark appended thereto. (at P1 in FIG. 4; step 51 in FIG. 5)

Next, the VTR 1 rewinds the tape slightly while counting (up-counting) the feed value $N_B$ (period $D_1$; step 52). After that, the VTR resumes the normal playback operation (period E1; step 53), and it down-counts the tape feed value. The normal playback feed is continued until the count value approaches $N_B$ (until the count value of the up/down counter approaches zero) (step 54). When the count value reaches $N_P$ which is near the value $N_B$, the VTR writes-in the freeze mark in the period which is intended to select, while retaining the normal playback operation (at P2 in FIG. 4; step 55). Alternatively, the freeze command is issued so that the intended frame is stored in the memory means 22 of the printer 2.

Figure 10:
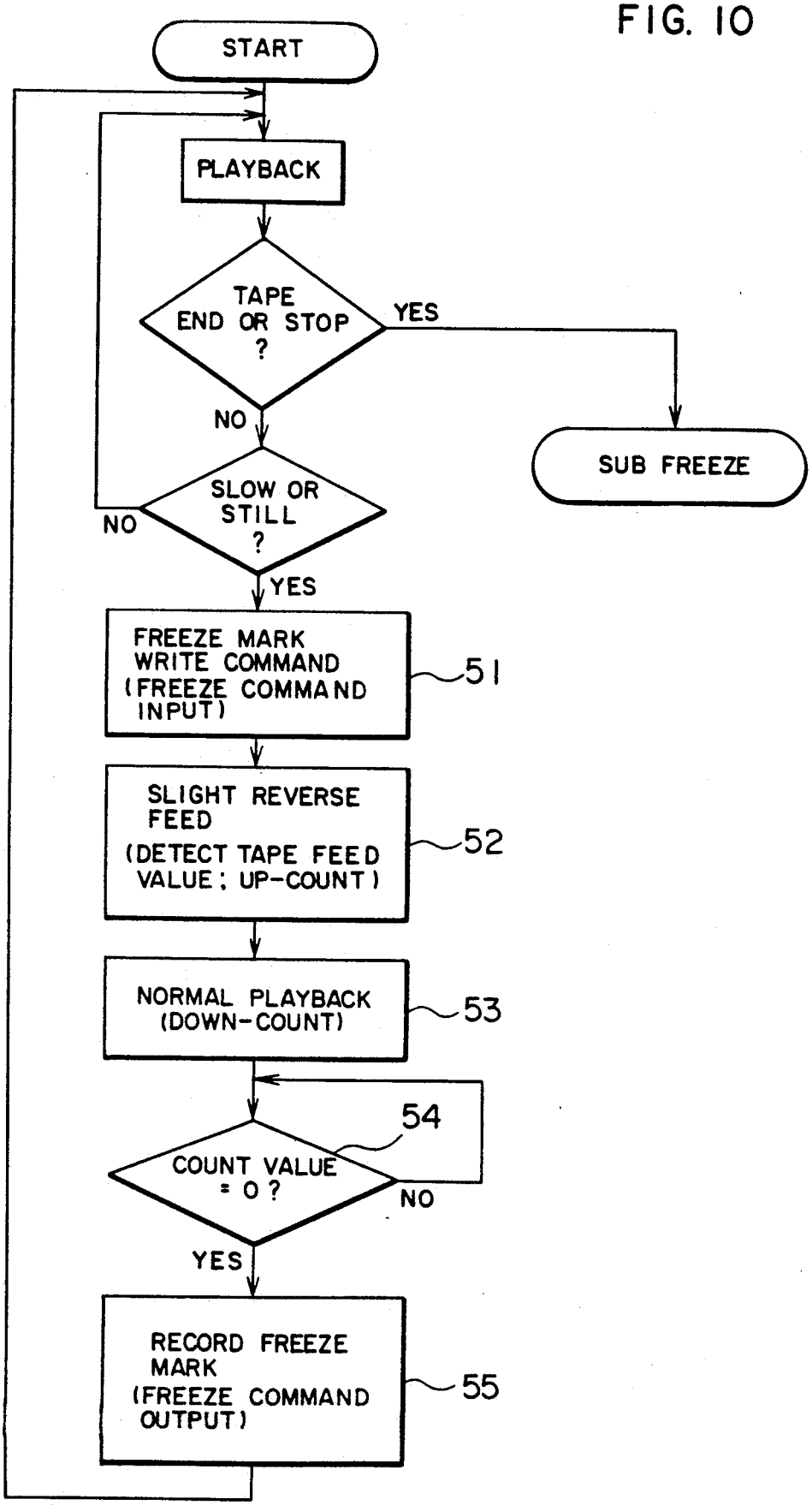
FIGS. 10, 11 and 12 are flowcharts explaining the operation of the embodiments of this invention.
Figure 12:
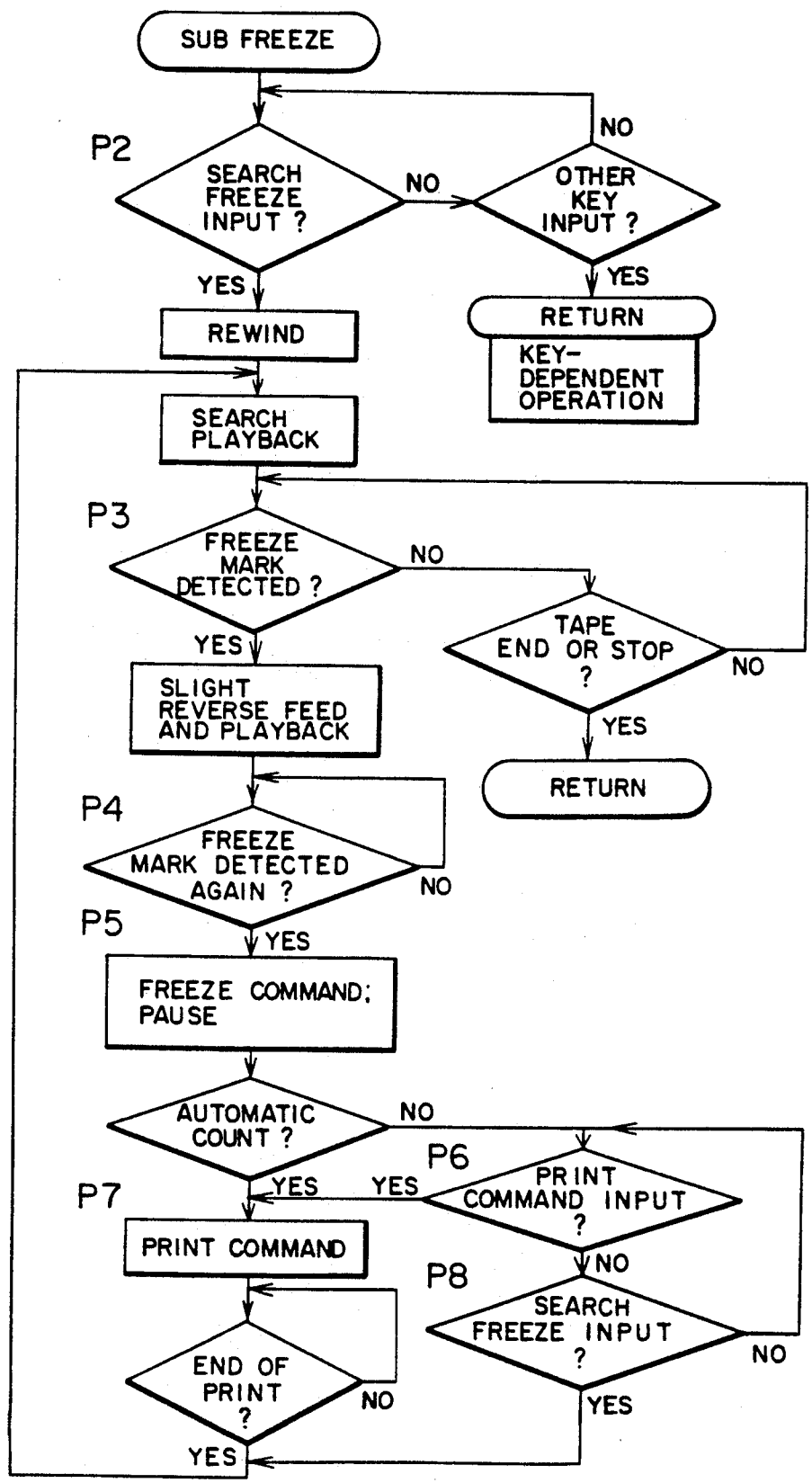

The control sequence returns to the start point in FIG. 10, and when a frame which is intended to print appears, it is selected in the slow or single-frame feed playback operation and the freeze mark is written to it in the same manner as the previous event. (Alternatively, the freeze command is entered to store the intended frame in the memory.) On completion of these operations, the frame of the picture is printed in accordance with the subroutine process (SUB freeze) shown in FIG. 12.

The printer 2 has two modes of operation. One is automatic printing, and the other is manual printing. In the automatic print mode, the print operation starts simultaneously to the frame freeze operation (at P7 in FIG. 12), and at the end of printing the VTR 1 is brought back to the search playback mode so as to detect the next freeze mark. In the manual print mode, the user confirms the freezed picture, and enters the print command if it is the intended frame of the picture (at P6 in FIG. 12). If, on the other hand, the freezed picture is not the intended one, the user checks the preceding and following frames and, after freezing the intended frame of the picture, enters the print command. If the user fails to find a frame of the picture which is intended to print, he enters the search-freeze command again (at P8 in FIG. 12) so that the search playback mode is restored. These operations are repeated until the tape end or until the user enters the stop command. The tape feed value detection in the embodiment of the frame mark scheme is implemented by following the embodiment shown in FIG. 5 through FIG. 9.

Figure 11:
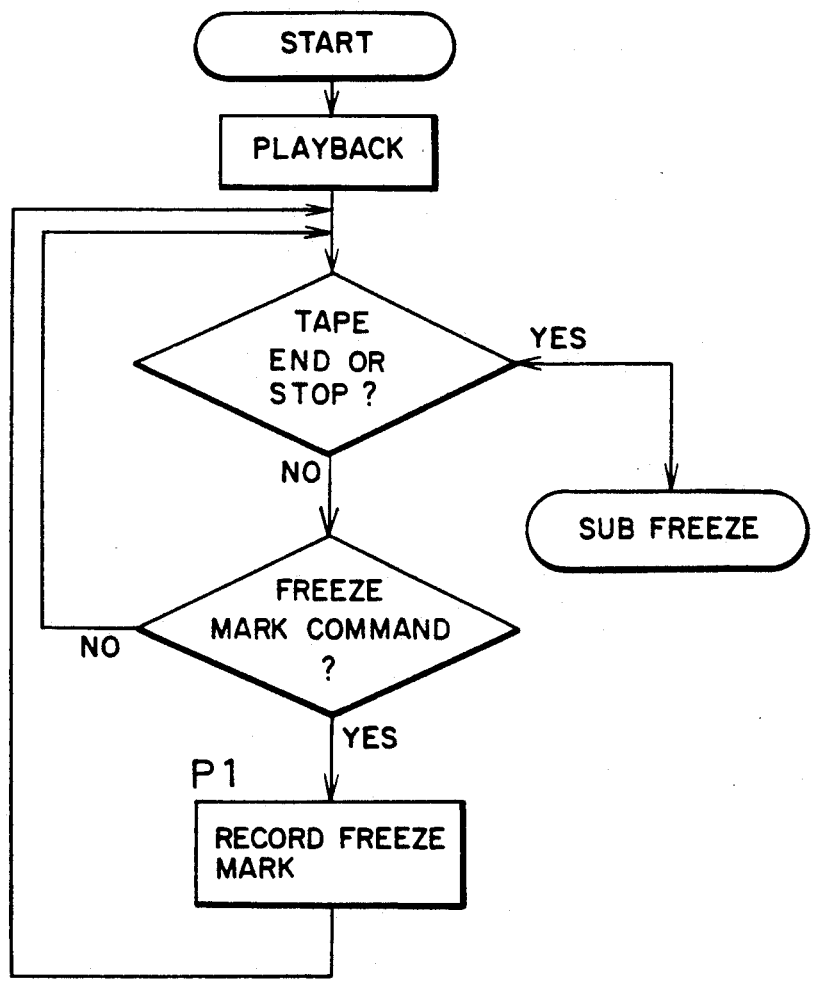

Next, an embodiment of the operational method of the area mark mode of item (D) will be explained using the flowchart of FIG. 11. The VTR 1 is assumed to be in the normal playback mode, in which the tape 38 is being fed continuously. When a frame of a picture which is intended to freeze or print appears, the user enters the command for writing a freeze mark, as an area mark in this case, on the operation means 16 or 27. Consequently, the freeze mark is recorded immediately in several frames (at P1 in FIG. 11). During this period, the VTR 1 stays in the normal playback operation. As the tape is fed across scenes, when the next section where the freeze mark is to be written comes, the user enters the freeze mark write command. These operations are repeated each time an intended frame is encountered.

On completion of the freeze mark write operations throughout the tape, the user enters the search-freeze command on the operation means 16 or 27. Then, the control sequence branches to the subroutine for freezing and printing (SUB freeze at P2 in FIG. 12). In response to this command, the VTR 1 enters the reverse playback or reverse high-speed playback (search-playback) mode. Alternatively, the VTR rewinds the whole tape and thereafter enters the search-playback mode, and subsequently searches for the freeze mark positions (at P3 in FIG. 12). On detecting the first freeze mark for the area mark, the tape is stopped and, after being rewound, fed in the normal playback mode in the cases of forward search, or the tape is fed in the normal playback mode immediately after stoppage in the case of reverse search. The freeze mark is detected again in a while (at P4 in FIG. 12), and the immediate frame or the succeeding frame is stored in the memory means 22 in the printer 2. At the same time, the VTR 1 enters the pause mode (at P5 in FIG. 12).

In case the freezed frame is approximately the intended frame, but is not the exact one, the user can select a preceding or succeeding frame and enter the freeze command again on the operation means 16 or 27. After a frame of a picture has been printed, the VTR resumes the search-playback operation in the direction (forward or reverse) memorized in the VTR controller 15 or the like. Among the automatic and manual mode of the printer operation, the user enters the print command in the manual mode in this case (at P6 in FIG. 12) thereby to print a series of frames between the area marks.

In the embodiment of the area mark mode, when the area mark is detected, in order to select a specific frame among frames, it is possible to record the second freeze mark in a specific frame (or a plurality of frames) in the freeze mark mode, and search the second freeze mark in the freeze mark mode thereby to print a detected frame each time or print all the detected frames at once afterward. Tape feed value detection in the reverse and forward tape feed operation is implemented by following the embodiment shown in FIG. 5 through FIG. 9.

Figure 13:
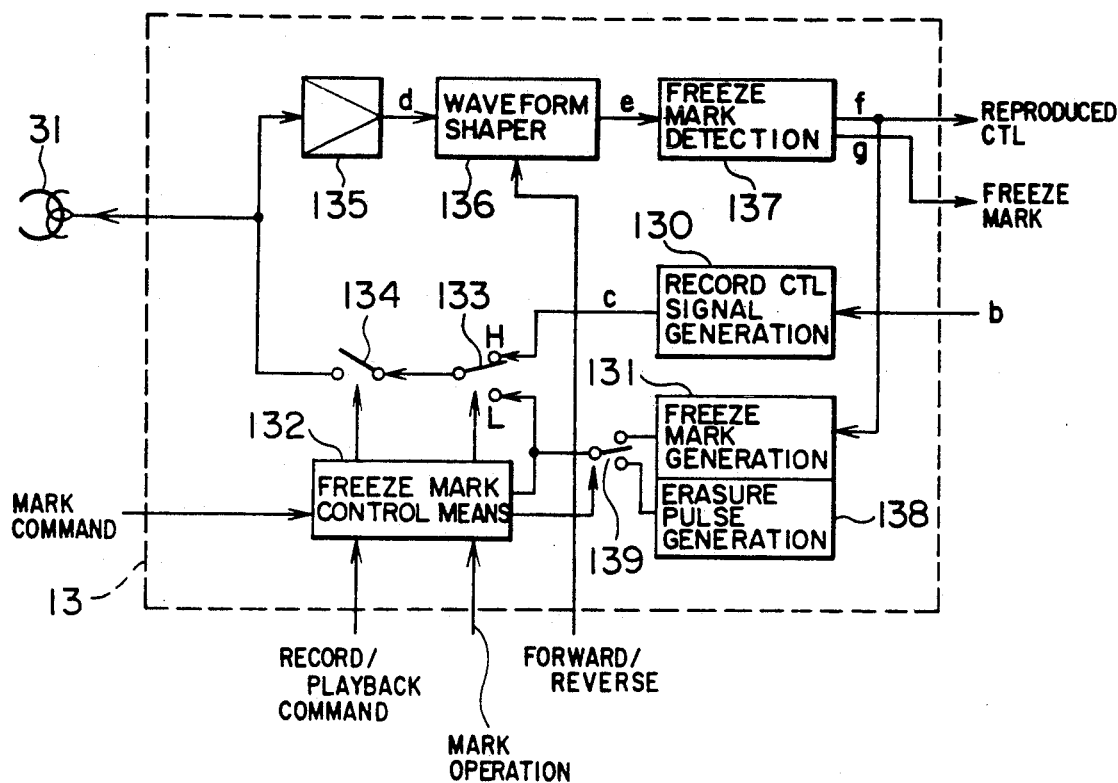
FIG. 13 is a block diagram of the freeze mark recording means according to an embodiment of this invention.
Figure 14:
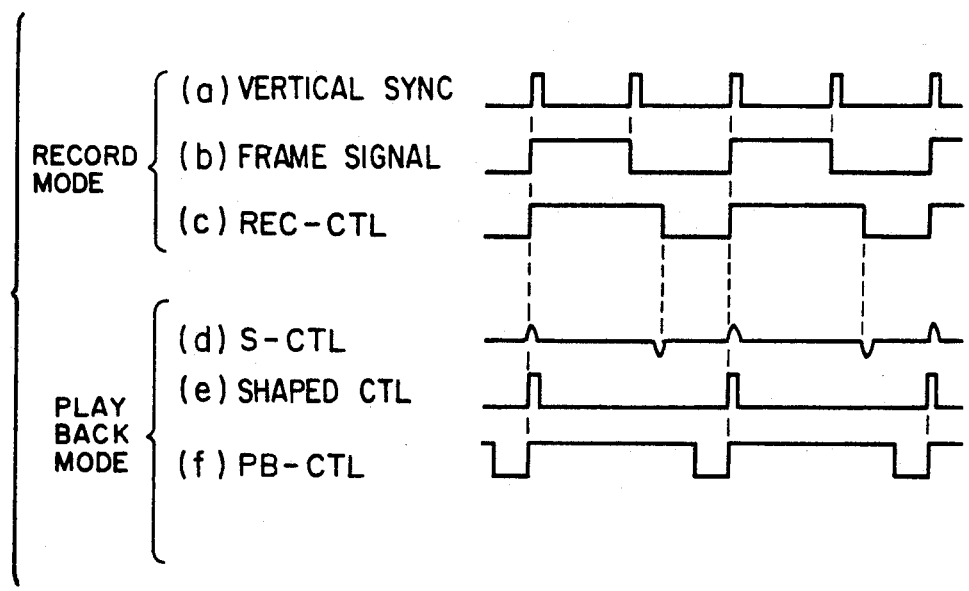
FIG. 14 is a timing chart used to explain the normal operation of the arrangement shown in FIG. 13.

FIG. 13 shows an embodiment of a means of recording and reproducing the freeze mark on the control track, as a method of recording the freeze mark in the normal playback mode. Shown in the figure is an embodiment of the control signal processing means 13. In FIG. 13, indicated by 130 is a record control (CTL) signal generation means, 131 is a freeze mark generation means, 132 is a freeze mark control means, 133 is a record CTL selector, 134 is a CTL record switch, 135 is a playback amplifier, 136 is a waveform shaping circuit, 137 is a freeze mark detection means, 138 is a erasure pulse generation means, and 139 is a mark control switch. First, the operation of the CTL signal processing means 13 in the normal recording/reproduction mode without using the freeze mark will be explained. FIG. 14 shows the waveforms of b, c, d, e and f in FIG. 13. At recording, a frame signal (b) (30 Hz in NTSC system or 25 Hz in PAL system) produced by demultiplying the vertical sync signal (shown by (a) in FIG. 13) in the video signal is shaped with the record CTL signal generation means 130 to produce the REC-CTL signal shown by (c) in FIG. 13. This signal is delivered to the CTL record switch 134 by way of the CTL selector 133. In response to the recording command from the VTR controller 15, the freeze mark control means 132 turns on the CTL record switch 134 to connect the record CTL selector 133 to the H side thereby to apply the REC-CTL signal to the control head 31.

In the subsequent playback operation, the CTL record switch 134 is turned off by the playback command from the VTR controller 15. The same control head 31 as for recording is used to reproduce the control signal on the control track in FIG. 2. The reproduced control signal is very weak (10 mV or lower) and it is amplified by the playback amplifier 135 to produce a S-CTL signal shown by (d) in FIG. 14. The signal is further processed by the succeeding waveform shaping circuit 136 so that only positive pulses in the S-CTL signal are extracted as shown by (e) in FIG. 14. (Negative pulses are extracted in the reverse tape feed mode.) The shaped CTL signal (e) is fed to the freeze mark detection mans 137, by which noises are removed, and a reproduced CTL signal (f) is delivered. The reproduced CTL signal (f) is supplied to the servo control means 14 and control judgement means 20 in the printer 2.

Figure 4:
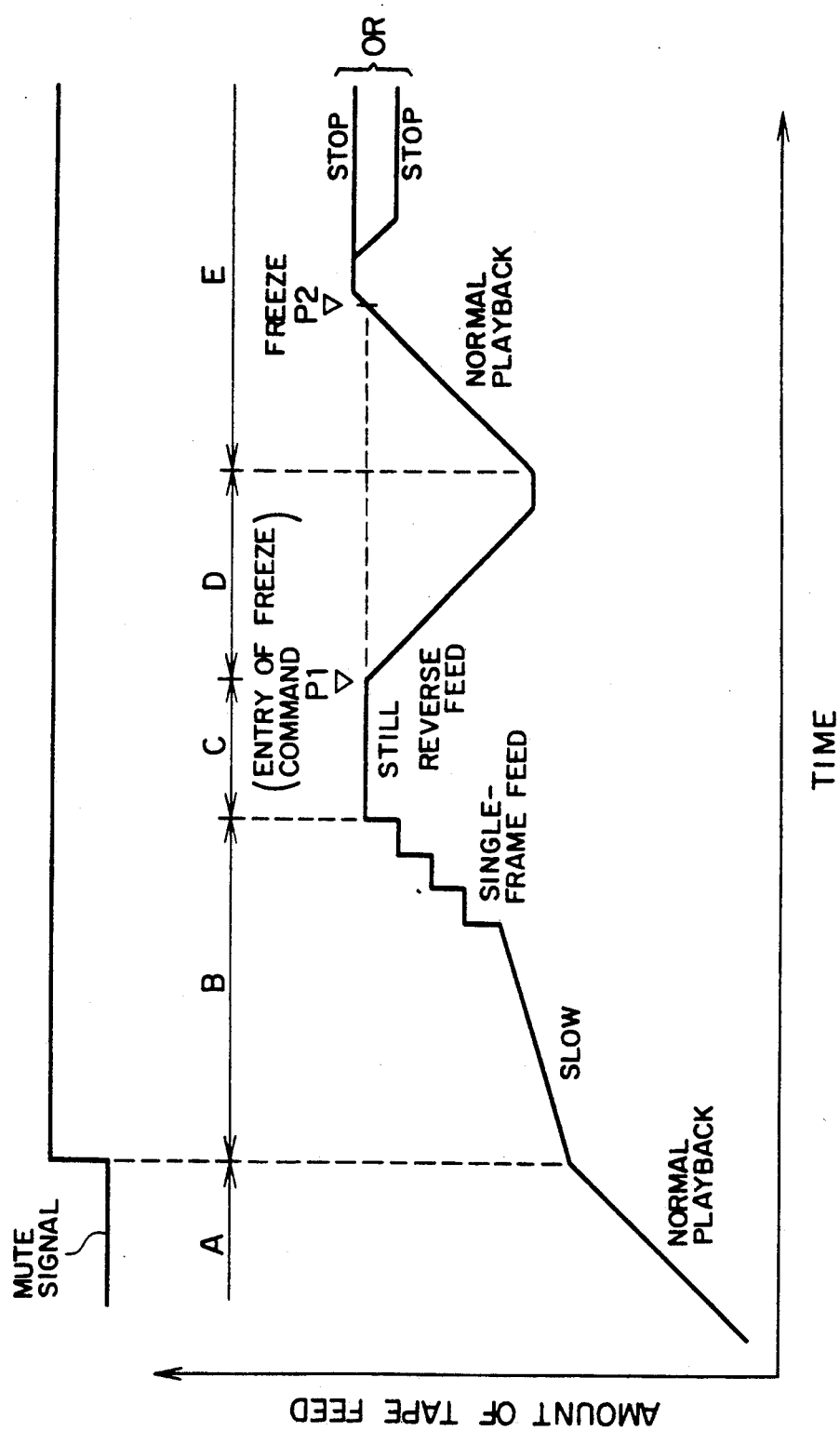
FIG. 4 is a diagram showing the tape feed operation according to another embodiment of this invention.

Next, the operation of the VTR 1 in recording and reproducing the freeze mark in the normal playback mode will be explained using FIG. 15, in which the same waveforms as in FIG. 4 are referred to by the same symbols. The VTR 1 is assumed to be in the playback mode (period A in FIG. 15). In this state, the record CTL selector 133 is positioned to the "L" side, and the freeze mark generation means 131 continuously produces the freeze mark signal 1 with a certain phase relationship of $T_5>0$, $T_6>0$ and $T_7>0$ shown by (5) in FIG. 14 with respect to the reference phase of reproduced CTL signal (f). The generated signal is delivered to the CTL record switch 134 by way of the CTL selector 133, as well as to the freeze mark control means 132.

Figure 15:
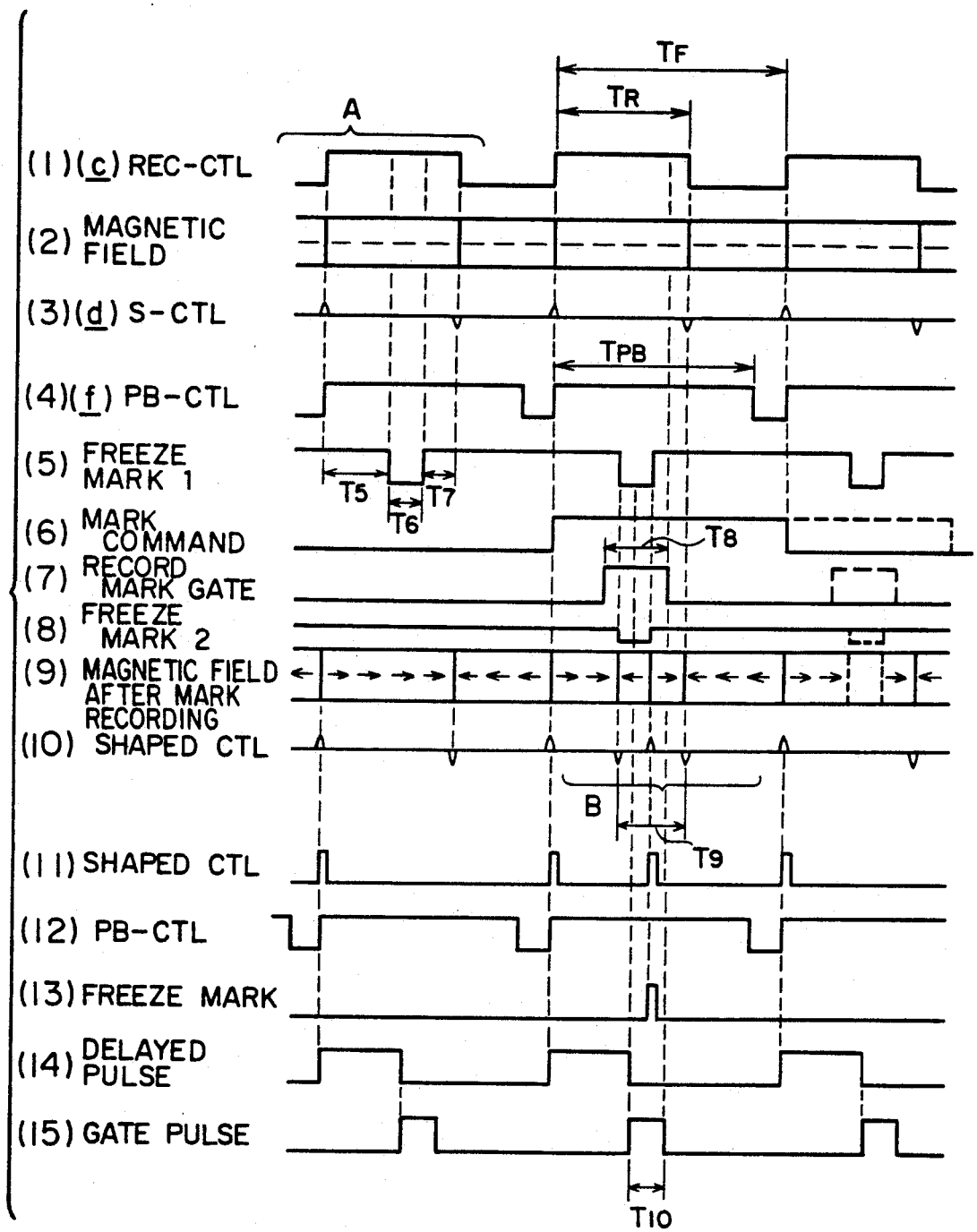
FIG. 15 is a timing chart used to explain the freeze mark recording operation of the arrangement shown in FIG. 13.

The freeze mark control means 132 receives from the frame control means 17 the freeze signal shown by (6) in FIG. 15 which specifies a frame where the freeze mark is to be recorded. The freeze mark 1 is produced so that its low period is included at least in the high period $T_R$ of the REC-CTL signal shown by (1) in FIG. 15. The PB-CTL signal (shown by (4) in FIG. 15) is generated in such a phase relation for its high period $T_{PB}$ as $T_R<T_{PB}<T_F$, where $T_F$ is the period of the REC-CTL signal derived from the frame period. The record mark gate (shown by (7) in FIG. 15) is generated in such a phase relationship as $T_6<T_8<T_R$, with the period $T_6$ being included in the period $T_8$, and in synchronism with this gate pulse, the CTL record switch 134 is closed. Consequently, the freeze mark 2 (shown by (5) in FIG. 15) which is actually recorded is applied to the control head 31.

Shown by (2) in FIG. 15 is the magnetic field on the tap before the freeze mark is recorded, and (9) is the magnetic field after the freeze mark is recorded. In case the freeze marks are recorded over several frames, the signals of (6), (7) and (8) in FIG. 15 are produced as shown by the dashed line in FIG. 15.

Next, the operation of the freeze mark detection in playing back a tape, with a freeze mark being recorded thereon, will be explained. The reproduced control signal S-CTL in this operation has a waveform shown by (10) in FIG. 15, and it is a pulse train with a period of B having a non-periodic section in part. The S-CTL signal is fed through the waveform shaping circuit 136, which delivers only positive shaped pulses to from the shaped CTL signal shown by (11) in FIG. 15.

The PB-CTL signal shown by (12) in FIG. 15 and a delayed pulse shown by (14) in FIG. 15 is produced at the falling edge of the delayed pulse. The delayed pulse and gate pulse have their phases determined such that the high period $T_{10}$ of the gate pulse comes in the negative pulse period $T_9$ within the period B of the S-CTL signal. By taking a logical product between the gate pulse and shaped CTL signal, the freeze mark shown by (13) in FIG. 14 is detected.

Figure 16:
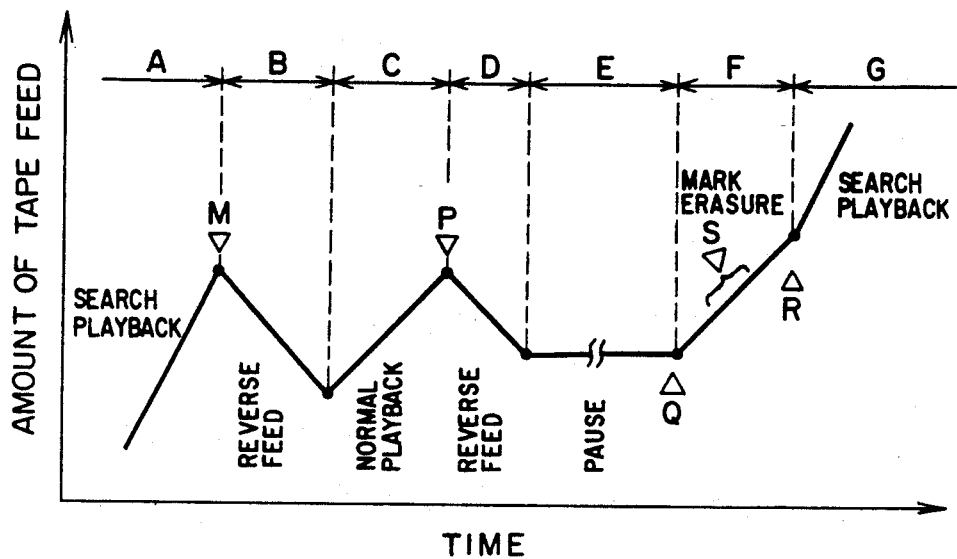
FIG. 16 is a diagram used to explain the timing of the freeze mark erasure.
Figure 17:
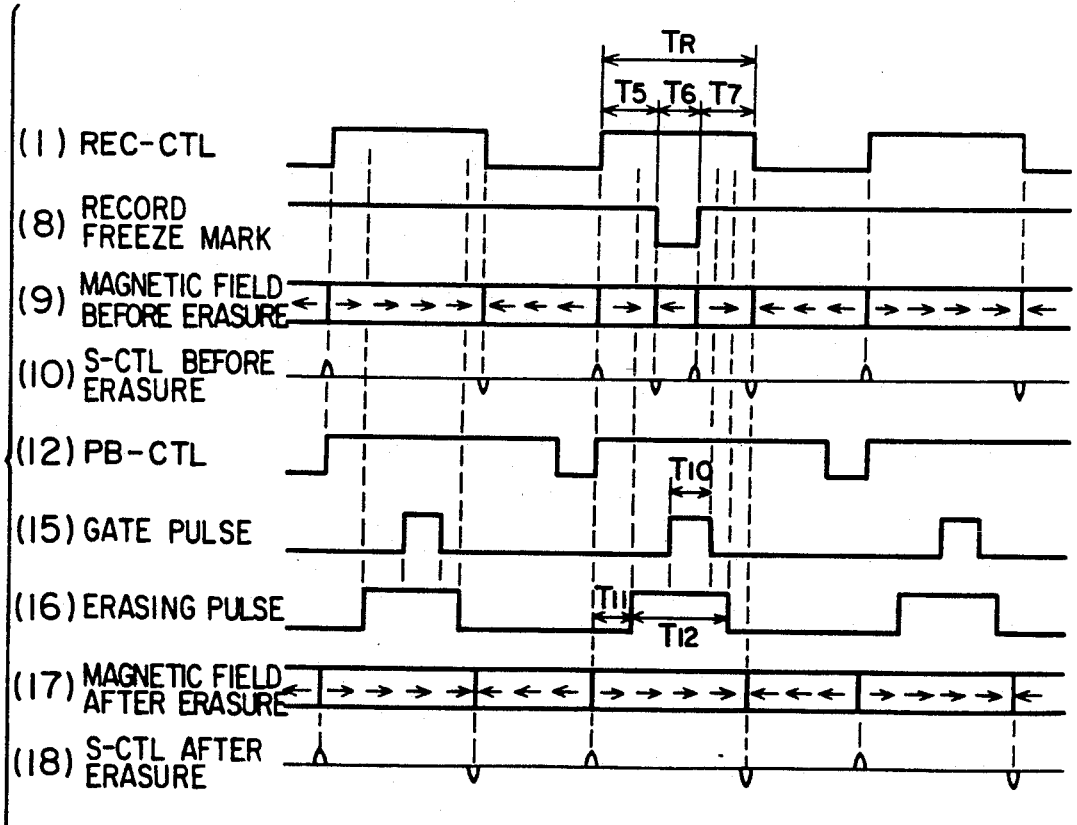
FIG. 17 is a timing chart showing the generation of the freeze mark erasing pulse.
Figure 18:
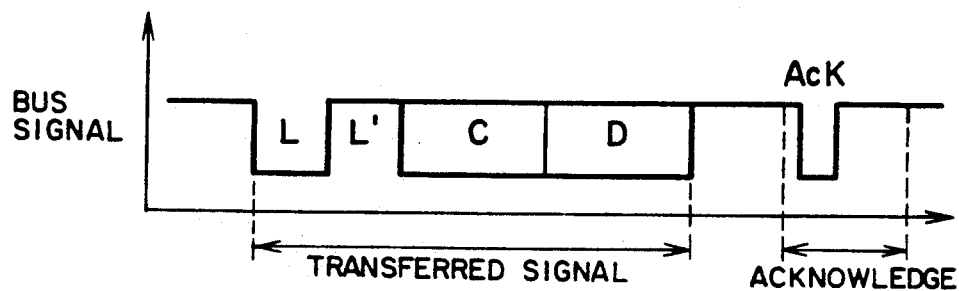
FIG. 18 is a diagram showing the data format on the data line.

In case a tape, with freeze marks being already recorded thereon, is played back on a VTR of another type, as in another embodiment of this invention, the servo system can be disturbed due to the discontinuity of the control signal, resulting possibly in an unstable picture reproduction. On this account, freeze marks are erased after printing. A method of erasure will be explained with reference to FIG. 16 and FIG. 17. In FIG. 17, the same pulse signals as in FIG. 15 are given the common numbers. The erasure pulse generation means 138 receives the reproduced CTL signal (shown by (12)

in FIG. 17) from the freeze mark detection means 137. Derived from this reproduced CTL signal, the erasure pulse having a high period of $T_{12}$ and a delay of $T_{12}$ is produced as shown by (16) in FIG. 17. The high period of the erasure pulse includes the low period $T_6$ of the recorded freeze mark (shown by (8) in FIG. 17) and the high period $T_{10}$ of the gate pulse (shown by (15) in FIG. 17), and is timed to be included in the high period $T_R$ of the REC-CTL signal (shown by (1) in FIG. 17). Consequently, noises caused by the edges of the freeze mark pulse and gate pulse are removed.

The erasure pulses are applied to the control head 31 by way of the mark control switch 139, record CTL selector 133 and CTL record switch 134 over a few frames before and after the freeze mark position.

The timing of writing the erasure pulse will be explained with reference to FIG. 16. A Freeze mark is searched in the search mode (period A) and it is detected at time point M, then the tape is reversely fed slightly (period B). Immediately after that, the VTR enters the normal playback mode (period C) and operates to detect the freeze mark. On detecting a freeze mark (at time point P), the reproduced frame of the picture is introduced automatically to the memory means 22 in the printer 2. At the same time, the VTR 1 reversely feeds the tape slightly (period D), and enters the pause mode (period E). The amount of reverse tape feed is detected by following the embodiment shown in FIG. 5 through FIG. 9. On completion of printing (at time point Q), the VTR proceeds to the subsequent freeze mark detecting separation. At this time, the above-mentioned detected freeze mark position is searched, and erasure pulses are recorded over a few frame periods before and after the mark position thereby to erase the freeze mark (at time point S). On completion of freeze mark erasure (at time point R), the VTR resumes the search operation to detect another freeze mark (period G). In this manner, each time a freeze mark is detected, the control sequence returns to the state of time point M.

In the case of freezing and/or printing a frame of a picture, as in another embodiment of this invention, the audio signal from the audio head 44 is muted (cut off). FIG. 4 shows the period of audio muting which is accomplished by application of the mute signal. Besides the variable-speed playback mode (periods B and C), the audio output is muted during the whole period from the entry of freeze command P1 to the reverse/normal playback, freeze P2 and stop or recursive reverse/stop. The mute state can be judged easily by the signal from the VTR controller 15 and frame control means 17.

The following explains the control signals on the bus lines 510. The control signals on the bus lines (will be termed the bus signals hereinafter) are a series of data strings including a reader segment L, custom segment C, data segment D and acknowledge segment Ack, for example. Each data string is given a certain pulse length, and it is transferred according to that specification. For example, in case the freeze command is sent from the VTR 1 to the printer 2, bus signals formed of the printer custom code, the data code of freeze command, and the reader pulse is sent. On detecting this signal, the printer 2 returns the acknowledge signal Ack to the VTR 1 in accordance with the specification, and at the same time the VTR 1 enters the freeze operation for the memory means 22. Similarly, such bus signals as the print command, power on/off control and output signal switching control signals are transferred. In case the command of the received data code cannot be executed on the part of the receiver, the acknowledge signal is not returned, for example, in case the printer cannot proceed to printing (due to out of ink ribbon, out of print paper, etc.) at the reception of the print command, the acknowledge signal Ack is not returned to the VTR 1. These signals may be transferred in combination, of course. Namely, in case a video output from the VTR 1 is viewed on the monitor unit 3, the printer 2 is not always required to be active. In viewing the video output of the VTR 1, with the printer 2 being inactive, for example, when a frame of a picture which the user wants to record on the tape or print appears, it is possible to record or freeze the frame automatically by transferring the record start command to the VTR 1 of the power-on/freeze command to the printer 2 by using the remote control means. For this purpose, the remote control units associated with the VTR, printer and monitor units are provided with the freeze key and print key.

In case the acknowledge signal is not detected in the above explanation, the bus signals may be sent again for a certain number of times to the sending unit. In order to check the busy status of a bus line, it is detected that the bus line is high for a prescribed duration.

Although in the foregoing embodiments, a frame of a picture that was intended to be freezed and/or printed was introduced from the VTR 1 to the printer 2, introduction of a frame of a picture which is viewed on the monitor unit 3 to the printer 2 or VTR 1 can also be accomplished in a similar operation.

Figure 19:
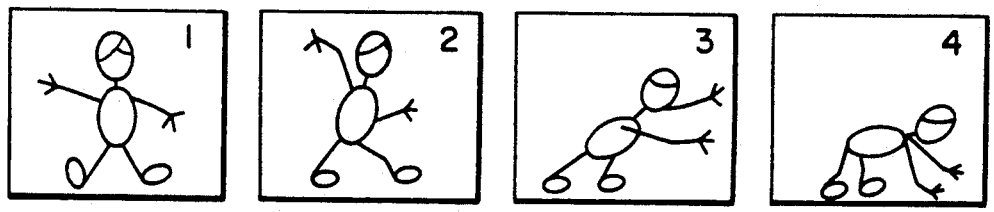
FIG. 19 is a set of diagrams showing examples of prints of freezed frames of a picture.
Figure 20A:
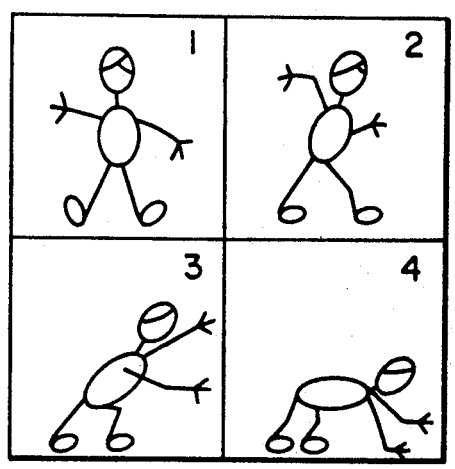
FIGS. 20A and 20B are diagrams showing other examples of prints of freezed frames of a picture.
Figure 20B:
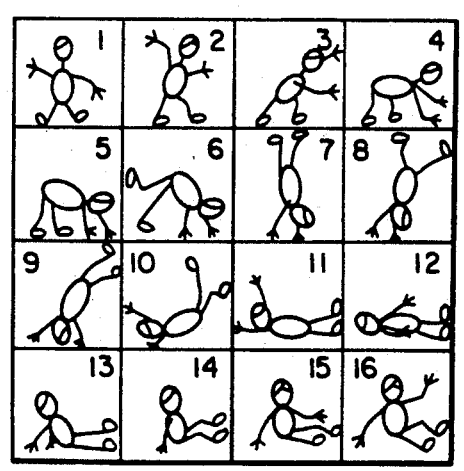

Although in the above explanation of a single frame of a picture introduced to the printer 2, this invention is not limited to this case. Instead, by provision of a plurality of frame memories for the memory means 22 in the printer 2, frames of a picture before and after the entry of the freeze command can be stored in the memory means 22. By using such a recording medium as a video floppy disk which can record the crude analog signal continuously, it is possible to record several frames to several tens frames. In this case, it is possible to freeze four frames of a picture continuously, and thereafter display these frames on the monitor unit 3 and print desired the frame, as shown in FIG. 19. Alternatively, it is possible to print the four frames in four-division arrangement by halving the size (a quarter area), as shown in FIG. 20A. It is of course possible to have continuous multiple printing for 16 frames as shown in FIG. 20B or as many as 25 frames.

Although in the foregoing system, the bus signals are sent to the VTR, printer and monitor unit, this invention is not limited to this case, but the signals may be sent to a BS tuner or a video apparatus made up of a single tuner.

The freeze and/or print command in the foregoing embodiments of this invention can be entered using any of the keys 501, 504 and 507 provided on the operation means 16, 27 and 303, or print keys 503, 506 or 509 provided on the remote control units 502, 505 and 508. The first stroke of the print key produces the freeze command, and the second key stroke produces the print command.

We claim:

1. A method for use in controlling a video print system including at least a recording medium playback apparatus, a printer and a monitor, said method comprising the steps of:

(1) playing back a recording medium by moving said recording medium frame by frame in a forward-/back direction;

(2) entering a command for freezing a specific frame of a picture;

(3) moving said recording medium in a reverse direction for a prescribed amount in response to an instruction from said printer upon receiving said freeze command;

(4) counting an amount of reverse movement of said prescribed amount;

(5) further playing back said recording medium again by moving said recording medium in a forward direction;

(6) counting an amount of forward movement of said recording medium during said further playback;

(7) comparing the counted amount of forward movement with said amount of reverse movement, and producing a freeze signal when the difference between said amount of forward movement and said amount of reverse movement is equal to a prescribed amount;

(8) storing said specific frame of said picture in a memory of said printer upon receiving said freeze signal; and (9) printing said stored frame of said picture.

2. A control method according to claim 1, further comprising, after said step of storing, the steps of turning said recording medium reversely for a prescribed amount, and thereafter stopping or pausing said recording medium.

3. A control method according to claim 1, wherein said counting step comprises the step of continuously counting FG (frequency generator) pulses in response to forward/back movements of said recording medium, the FG pulses being generated in response to the movement of said recording medium.

4. A control method according to claim 1, wherein said counting step comprises the step of continuously counting control signal pulses of a magnetic tape in response to forward/back movements of said tape.

5. A method for use in controlling a video print system including at least a recording medium playback apparatus, a printer and a monitor, said method comprising the steps of:

(1) playing back a recording medium by moving said recording medium frame by frame in a forward-/back direction;

(2) entering a command for freezing a specific frame of a picture;

(3) recording a freeze mark in said specific frame of said picture upon receiving said freeze command;

(4) selecting a plurality of frames of said picture which are to be printed by repeating said steps (1) through (3);

(5) turning said recording medium in a reverse direction until a head position of said recording medium is detected and fast playing back said recording medium in order to search for freeze marks;

(6) stopping said recording medium upon detection of a freeze mark and turning said recording medium in a reverse direction for a predetermined amount;

(7) playing back said recording medium and detecting said freeze mark again;

(8) storing said specified frame of said picture in a memory of said printer upon receiving a freeze signal informing of a detection of said freeze mark;

(9) automatically printing said stored frame of said picture;

(10) after the storing of said specified frame, fast playing back said recording medium in a forward direction in order to search for a subsequent freeze mark;

(11) stopping said recording medium upon detection of said freeze mark and turning said recording medium in a reverse direction for a predetermined amount; and

(12) repeating said steps (7) to (11) until all of said selected frames recorded with said freeze marks are printed.

6. A control method according to claim 5, further comprising the steps of:
turning said recording medium in a reverse direction for a predetermined amount; and
moving said recording medium to an unload position.

7. A control method according to claim 5, wherein said step (10) comprises the step of erasing said freeze mark corresponding to said printed frame before fast playing back said recording medium to search for a subsequent freeze mark.

8. A control method according to claim 5 or 6, wherein said step of storing comprises the step of:
recurrently playing back said recording medium for detecting said freeze mark again upon receiving a completion signal of a printing operation from said printer.

9. A method for use in controlling a video print system including at least a recording medium playback apparatus, a printer and a monitor, said method comprising the steps of:

(1) playing back a recording medium while moving said recording medium in a forward-direction;

(2) entering a freeze command for freezing a plurality of frames of a picture;

(3) recording a freeze mark in a head frame of consecutive frames of said picture which are selected for multiple printing upon receiving said freeze command;

(4) selecting a plurality of groups of consecutive frames of said picture which are to be printed by repeating said steps (1) through (3);

(5) moving said recording medium in a reverse direction by a predetermined amount and then playing back said recording medium again in order to search for said freeze marks;

(6) stopping said recording medium upon detection of a freeze mark and turning said recording medium in a reverse direction for a predetermined amount;

(7) playing back said recording medium and detecting said freeze mark again;

(8) producing a freeze signal upon detecting said freeze mark;

(9) automatically storing a plurality of frames among one said group of said consecutive frames in a memory of said printer after reducing frame size;

(10) printing said stored frames;

(11) fast playing back said recording medium in a forward direction in order to search for a subsequent freeze mark after the storing of said specified frames;

(12) stopping said recording medium upon detection of said freeze mark and turning said recording medium in a reverse direction for a predetermined amount; and

(13) repeating said steps (7) to (12) until a plurality of frames selected from all of said groups are printed.

10. A control method according to claim 9, wherein said step (9) comprises the step of selecting frames at intervals of one or more than one frame.

11. A control method according to claim 10, further comprising the steps of:
turning said recording medium in a reverse direction for a predetermined amount; and
moving said recording medium to an unload position.

12. A control method according to claim 9 or 11, wherein said step of storing comprises the step of:
recurrently playing back said recording medium for detecting said freeze mark again upon receiving a completion signal of a printing operation from said printer.

13. A control method according to claim 9, wherein said step of playing back comprises the step of operating in a slow playback or single frame feed playback operation.

14. A control method according to claim 9, wherein said step (11) comprise the step of erasing said freeze mark corresponding to said printed frame before fast playing back said recording medium to search for a subsequent freeze mark.

15. An apparatus for use in controlling a video print system including at least a recording medium playback apparatus, a printer and a monitor, said apparatus comprising:
(1) means for playing back a recording medium while moving the recording medium frame by frame in a forward/back direction;
(2) means for entering a command for freezing a specific frame of a picture;
(3) means for generating an instruction for moving said recording medium in a reverse direction for a first prescribed amount included in said printer upon receiving said freeze command;
(4) means for counting an amount of movement of said first prescribed amount;
(5) means for playing back said recording medium again by moving said recording medium after said reverse movement of said first prescribed amount;
(6) means for counting an amount of forward movement of said recording medium during said further playback;
(7) means for comparing said amount of forward movement with an amount of reverse movement of said prescribed amount, and producing a freeze signal when the difference between said amount of forward movement and said amount of reverse movement is equal to a prescribed value;
(8) means for storing said specific frame of said picture in a memory of said printer upon receiving said freeze signal; and
(9) means for printing said stored frame of said picture.

16. A control apparatus according to claim 15, further comprising:
means for moving said recording medium in said reverse direction for a second prescribed amount according to an instruction from said printer upon completion of said storing operation; and
means for stopping or pausing said moving of said recording medium after said reverse movement of said second prescribed amount.

17. An apparatus for use in controlling a video print system including at least a recording medium playback apparatus, a printer and a monitor, said apparatus comprising:
(1) means for playing back a recording medium by moving said recording medium frame by frame in a forward/back direction;
(2) mans for entering a command for freezing a specific frame of a picture;
(3) means for generating a freeze mark;
(4) means for recording said freeze mark in said specific frame of said picture upon receiving said freeze command;
(5) means for turning said recording medium in a reverse direction until a head position of said recording medium is detected and for fast playing back said recording medium again in order to search for freeze marks;
(6) means for stopping said recording medium upon detection of a freeze mark and for turning said recording medium in a reverse direction for a predetermined amount;
(7) means for playing back said recording medium and for detecting said freeze mark again;
(8) means for storing said specified frame of said picture in a memory of said printer upon receiving a freeze signal informing a detection of said freeze mark;
(9) means for automatically printing said stored frame of said picture;
(10) means for fast playing back said recording medium in a forward direction in order to search for a subsequent freeze mark after the storing of said specified frame;
(11) means for controlling said recording medium by said means (6) after the operation of said means (10); and
(12) means for successively operating said means (7) to (11) until all of said selected frames recorded with said freeze marks are printed.

18. A control apparatus according to claim 17, further comprising means for turning said recording medium in a reverse direction for a predetermined amount and for moving said recording medium to an unload position.

19. A control apparatus according to claim 17 or 18, further comprising:
means for recurrently playing back said recording medium for detecting said freeze mark again upon receiving a completion signal of a printing operation from said printer.

20. A control apparatus according to claim 17, wherein said means (10) comprises means for erasing said freeze mark corresponding to said printed frame before fast playing back said recording medium to search for a subsequent freeze mark.

21. A control apparatus according to claim 17, further comprising means for continuously counting FG (frequency generator) pulses in response to forward/back movements of said recording medium, the FG pulses being generated in response to the movement of said recording medium.

22. A control apparatus according to claim 17, further comprising means for continuously counting control signal pulses of a magnetic tape in response to forward/back movements of said tape.

23. An apparatus for use in controlling a video print system including at least a recording medium playback apparatus, a printer and a monitor, said apparatus comprising:

(1) means for playing back a recording medium while moving said recording medium in a forward direction;
(2) means for entering a freeze command for freezing a plurality of frames of a picture;
(3) means for recording a freeze mark in a head frame of consecutive frames of said picture which are selected for multiple printing upon receiving said freeze command;
(4) means for selecting a plurality of groups of consecutive frames of said picture which are to be printed by repeatedly operating said means (1) to (3);
(5) means for moving said recording medium in a reverse direction by a predetermined amount and for playing back said recording medium again in order to search for said freeze marks;
(6) means for stopping said recording medium upon detection of a freeze mark and for turning said recording medium in a reverse direction for a predetermined amount;
(7) means for playing back said recording medium and for detecting said freeze mark again;
(8) means for producing a freeze signal upon detecting said freeze mark;
(9) means for automatically storing a plurality of frames among one said group of said consecutive frames in a memory of said printer after reducing frame size;
(10) means for printing said stored frames;
(11) means for fast playing back said recording medium in a forward direction in order to search for a subsequent freeze mark after the storing of said specified frames;
(12) means for controlling said recording medium by said means (6) after the operation of said means (11); and
(13) means for repeatedly operating said means (7) to (12) until a plurality of frames selected from all of said groups are printed.

24. A control apparatus according to claim 17 or 23, wherein said playing back means comprises means for playing back in a mode of slow playback or single frame feed playback.

25. A control apparatus according to claim 23, wherein said means (9) comprises means for selecting frames at intervals of one or more than one frame.

26. A control apparatus according to claim 23 or 25, further comprising:
means for recurrently playing back said recording medium for detecting said freeze mark again upon receiving a completion signal of a printing operation from said printer.

27. A control apparatus according to claim 25, further comprising means for turning said recording medium in a reverse direction for a predetermined amount and for moving said recording medium to an unload position.

28. A control apparatus according to claim 23, wherein said means (11) comprises means for erasing said freeze mark corresponding to said printed frame before fast playing back said recording medium to search for a subsequent freeze mark.

* * * * *